Oct. 19, 1965 J. A. WHITELEY 3,212,726

REEL HOLDING DEVICE

Filed May 15, 1963 2 Sheets-Sheet 1

JAMES A. WHITELEY
INVENTOR.

BY Robert G. Clay

ATTORNEY

Oct. 19, 1965 J. A. WHITELEY 3,212,726

REEL HOLDING DEVICE

Filed May 15, 1963 2 Sheets-Sheet 2

JAMES A. WHITELEY
INVENTOR.

BY Robert G. Clay

ATTORNEY

United States Patent Office 3,212,726

Patented Oct. 19, 1965

3,212,726
REEL HOLDING DEVICE

James A. Whiteley, Campbell, Calif., assignor to Ampex Corporation, Redwood City, Calif., a corporation of California Filed May 15, 1963, Ser. No. 280,505
8 Claims. (Cl. 242—68.3)

This invention relates to reel holding devices and particularly to such devices adapted for locking a reel upon a shaft.

Previously in the art, reel holders have required the operator to use both hands, or to successively grasp several different parts of the mechanism with one hand. Such operation is complicated and difficult, and the apparatus provided has usually been expensive to manufacture and is space consuming.

Accordingly, it is an object of this invention to provide a reel holding device that is operable by a single hand.

It is another object of the invention to provide a reel holding device that is operable entirely by the reel and by the hand or hands of the operator working through and manipulating the reel alone.

It is still another object of the invention to provide a reel holding apparatus that projects a minimum distance beyond the reel.

A reel holding device in accordance with the invention includes a turntable mounted on a shaft, the turntable having a hub extending toward the shaft end and the hub end having two sets of radial notches forming a castellated end engaged by fingers extending radially from the shaft. The turntable is spring-loaded toward the shaft fingers. A set of keying lugs extend from the hub in line with one set of the notches of the castellated end of the hub. The reel has keyways fitting the keying lugs and is slipped onto the hub with the keyways also slipping over the shaft fingers. The reel and turntable are then depressed on the shaft, rotated a portion of a turn, and are released so that the spring causes the turntable to rise and engage some of the hub notches with the shaft fingers, which thus secure the assembly for rotation on the shaft, and lock the reel against axial disassembly from the shaft. The entire operation can be performed with one hand grasping only the reel.

A better understanding of the invention may be had by reference to the following description, taken in conjunction with the accompanying drawings, in which.

Figure 1:
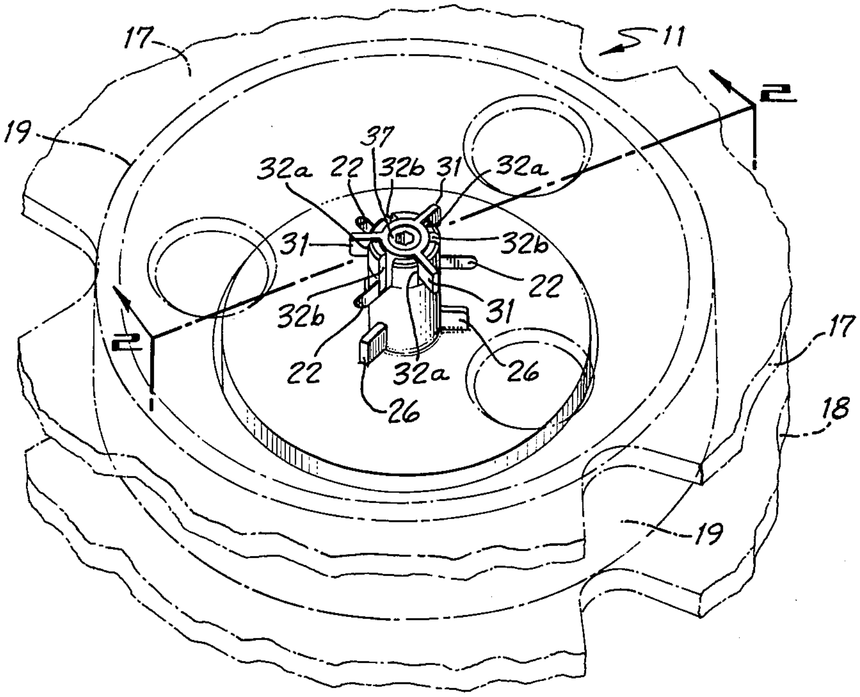
FIGURE 1 is a fragmentary perspective of a reel and holding device constructed in accordance with the invention.
Figure 2:
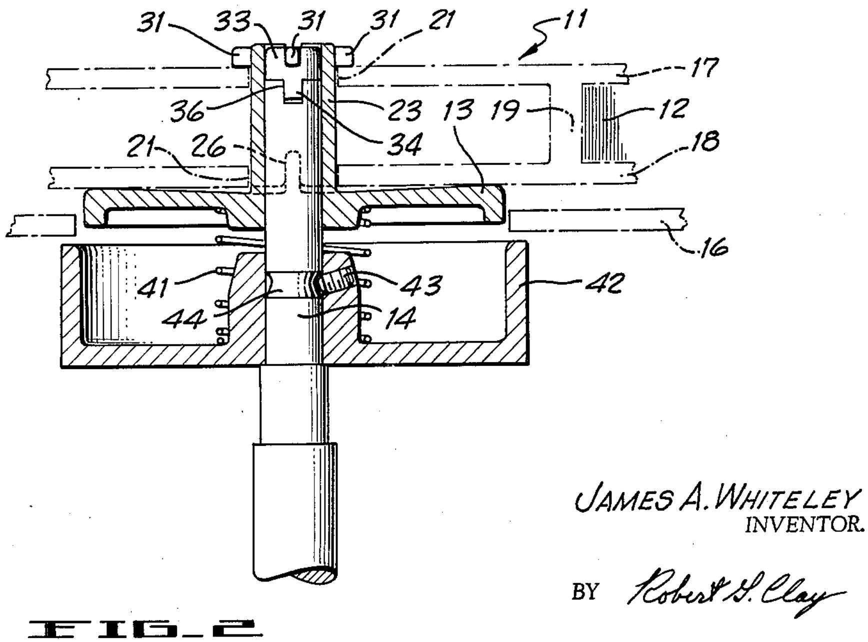
FIGURE 2 is a cross sectional elevation taken along the plane of lines 2—2 of FIGURE 1.

Referring now to the drawing and particularly to FIGURES 1 and 2 thereof, there is shown a portion of a magnetic tape transport reel 11 on which a tape 12 may be wound, and a turntable 13 and shaft 14 for mounting the reel in relation to the top plate 16 of a magnetic tape transport. The reel 11 is of a type that is common in the tape transport art in that it has a pair of side flanges 17 and 18 structurally connected by means of a ring 19 that defines a drum for the winding of the tape 12; and a central bore 21 is formed in each of the flanges to permit assembly on the shaft 14. Each of the flnages is provided with three circumferentially equi-spaced keyway slots 22 for use in keying the reel for rotation with the shaft. In FIGURE 1, only the keyway slots 22 of flange 17 are illustrated to avoid confusion, because the reel 11 is made of transparent material. However it will be understood that the lower flange 18 has a set of three keyway slots 22 positioned in the same azimuthal orientation as the slots 22 of the upper flange 17.

As shown in FIGURE 2, the turntable 13 has a central tubular hub 23, which is the portion of the apparatus that actually engages the bores 21 of the reel flanges. To lock the reel upon the hub, a set of three circumferentially equi-spaced keying lugs 26 extend from the hub 23 and turntable 13 to engage the keyway slots 22 of the adjacent reel flange 18. The turntable 13 is in turn keyed to the shaft 14 as by means of a set of three circumferentially equi-spaced fingers 31 extending radially from the shaft 14 and engaging corresponding radial notches 32 formed in the extending end of the hub 23 of the turntable. As shown in FIGURE 2, the fingers 31 are formed on a cap member 33 having an extension 34 fitting into a central groove 36 of the shaft 14, the cap being secured to the shaft as by means of a bolt 37 (FIGURE 1) at the axis of the assembly. As shown in FIGURE 1, the reel, mounted properly on the turntable for operational use, is axially retained thereon as by means of the fingers 31, which overlie the adjacent solid portions of the upper flange 17, bisecting the angles between the keyway slots 22 of the reel flanges. To maintain the assembly in this position, the turntable and and its hub 23 are spring-loaded for axial movement toward the fingers 31, as shown in FIGURE 2. A compression spring 41, here shown as a helical spring, is mounted between the lower side of the turntable 13 and a brake drum 42 also mounted on the shaft 14, the drum 42 being retained on the shaft as by means of a set screw 43 engaging a recess 44 in the shaft 14. The turntable 13 and its hub 23 are free for axial sliding motion on the shaft 14, but forces must be applied to overcome the resistance of the spring 41 in order to move the turntable downwardly as shown in FIGURE 2. During actual operation, however, the turntable and reel are positioned by the spring 41 in the upper position as shown in FIGURES 1 and 2.

The position of the device shown in FIGURE 1 is herein termed the "first axial position and first rotational position" of the turntable with respect to the shaft, this position also constituting a "locking position" of the assembly, and is the position in which the reel is securely retained on the turntable and shaft for rotation therewith. It is noted that there are six notches 32, three of which are referred to specifically as notches 32*a*. The notches 32*a* are equi-spaced circumferentially and engage the fingers 31 when the turntable is in the first axial and first rotational position. The other three notches 32 are referred to specifically as notches 32*b*, and are also circumferentially equi-spaced and positioned between the notches 32*a* so as to be directly in line with the keying lugs 26 previously referred to. Thus, in order to remove the reel 11 from the assembly, it is necessary to achieve a condition in which the fingers 31 are engaging or are in line with the notches 32*b* and consequently with the keying lugs 26, so that the reel flange keyway 22 will coincide with the fingers 31 to permit axial sliding motion of the reel off the turntable and shaft.

Figure 3:
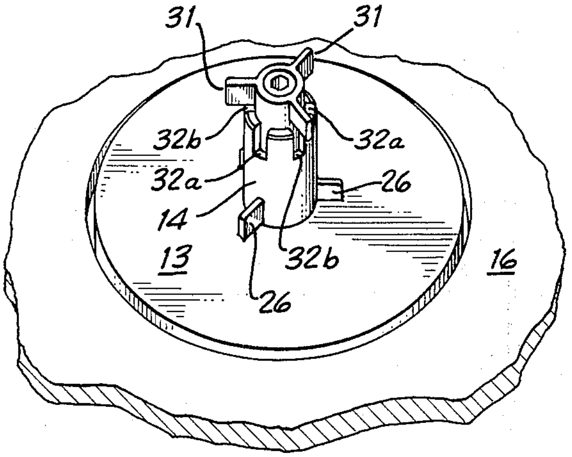
FIGURE 3 is a perspective taken substantially as in FIGURE 1 but showing the apparatus in a different position.
Figure 4:
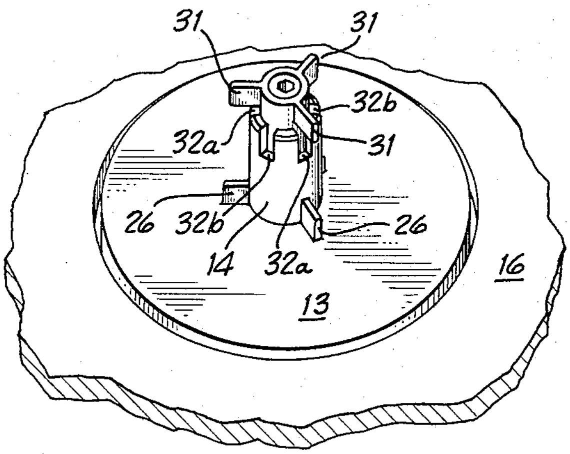
FIGURE 4 is a perspective taken substantially as in FIGURE 1 but showing the apparatus in a still different position.
Figure 5:
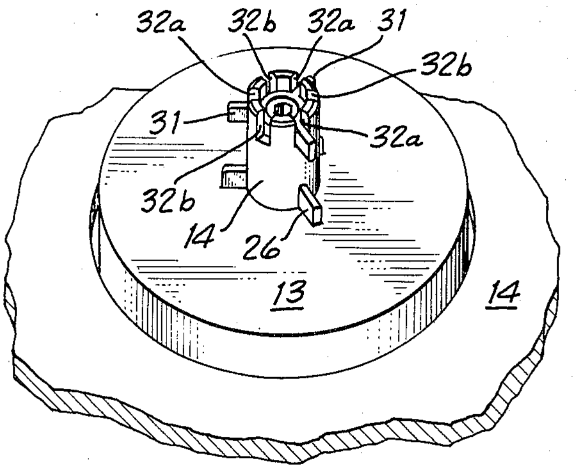
FIGURE 5 is a perspective taken substantially as in FIGURE 1 but showing the apparatus in even a still different position.

Such an operation is illustrated in FIGURES 3–5. In FIGURE 3, the turntable 13 has been depressed to move the hub 14 to a second axial position in which the fingers 31 are clear of the notches 32*b* but are still in the first rotational position aligned therewith. Then as shown in FIGURE 4, the turntable 13, still in the second axial position, is rotated to its second rotational position, in which the fingers 31 are aligned with notches 32*a* and keying lugs 26. Then as shown in FIGURE 5, the turntable is permitted to rise under the urging of spring 41 until the fingers 31 are seated in and engaged with the notches 32*a*, when the turntable is returned to its first axial position but remains in its second rotational position. In this combination of positions, also referred to herein as an "unlocking position" of the assembly, the reel 11 may be freely removed or replaced on the turntable. To return the assembly to locking position, it is necessary to follow the sequence of FIGURES 5, 4, 3 and 1, depressing the turntable to second axial position (FIGURE 4) rotating the turntable to first rotational position (FIGURE 3), and releasing the turntable to return to first axial and first rotational position (FIGURE 1).

During rotation of the turntable in the second axial position, as between the first and second rotational positions (FIGURES 3 and 4), a brake band or shoe (not shown) engages the brake drum 42 so as to hold the shaft 14 in a stationary position. The brake band may be arranged, as by means well known in the art, to automatically engage the drum whenever the transport is not in a play, record or rewind mode of operation.

It is to be noted that the apparatus in the first axial position has two sub-positions. One sub-position is shown in FIGURE 5 in which the fingers 31 engage the bottoms of the notches 32*a* when no reel is positioned on the turntable. The other sub-position is shown in FIGURE 1, in which the fingers are substantially flush with the end of the hub 23 and engage the reel 11 but not the bottoms of the notches 32*a*.

Thus there has been described a reel holding device in accordance with the invention which includes a turntable mounted on a shaft, the turntable having a hub extending toward the shaft end and the hub having two sets of radial notches forming a castellated end engaged by fingers extending radially from the shaft. The turntable is spring-loaded toward the shaft fingers. A set of keying lugs extend from the hub in the line with one set of the notches of the castellated end of the hub. The reel has keyways fitting the keying lugs and is slipped onto the hub with the keyways also slipping over the shaft fingers. The reel and turntable are then depressed on the shaft, rotated a portion of a turn, and are released so that the spring causes the turntable to rise and engage some of the hub notches with the shaft lugs fingers, which thus secure the assembly for rotation on the shaft, and lock the reel against axial dissassembly from the shaft. The entire operation can be performed with one hand grasping only the reel.

What is claimed is:

1. A device including a reel, a shaft, and means releasably locking said reel upon said shaft, comprising:

first means permanently mounted on said shaft for axial movement between first and second axial positions, said first means in said first axial position having at least a pair of first and second rotational positions with respect to said shaft, said first means also being provided with a detent receiving portion;

second means immovably mounted on said shaft and including a detent portion engaging said detent receiving portion of said first means and for thereby positively retaining said first means against rotation with respect to said shaft and in said first and second rotational positions when said first means is in said first axial position; and third means mounted on said shaft and urging said first means toward said first axial position thereof;

said reel being engaged by said first means and being thereby secured against rotational motion with respect to said shaft when said first means is concurrently in said first axial position and first rotational position thereof; and said reel being engaged by said second means and being thereby secured against axial disassembly motion with respect to said shaft when said first means is in said first rotational position thereof.

2. A device including a reel, a shaft, and means releasably locking said reel upon said shaft, comprising:

first means permanently mounted on said shaft for movement between first and second axial positions, said first means also being movable between first and second rotational positions with respect to said shaft but only when said first means is in said second axial position on said shaft, said first means also being provided with a detent receiving portion;

second means immovably mounted on said shaft and including a detent portion engaging said detent receiving portion of said first means and for thereby positively retaining said first means against rotation with respect to said shaft and in said first and second rotational positions when said first means is concurrently in said first axial position on said shaft;

third means mounted on said shaft and urging said first means toward said first axial position thereof;

said reel being engaged by said first means and being thereby secured against rotational motion with respect to said shaft when said first means is concurrently in said first axial and first rotational positions; and said reel being engaged by said second means and being thereby secured against axial disassembly motion with respect to said shaft when said first means is concurrently in said first axial and first rotational positions.

3. A device including a reel, a shaft, and means releasably locking said reel upon said shaft, comprising:

first means permanently mounted on said shaft for movement between first and second axial positions, said first means also being movable between first and second rotational positions with respect to said shaft but only when said first means is in said second axial position on said shaft, said first means also being provided with a detent receiving portion;

second means immovably mounted on said shaft and including a detent portion engaging said detent receiving portion of said first means and thereby positively retaining said first means against rotation with respect to said shaft and in said first and second rotational positions when said first means is concurrently in said first axial position on said shaft;

third means mounted on said shaft and urging said first means toward said first axial position thereof;

said reel being engaged by said first means and being thereby secured against rotational motion with respect to said shaft when said first means is concurrently in said first axial and first rotational positions;

said reel being engaged by said second means and being thereby secured against axial disassembly motion with respect to said shaft when said first means is concurrently in said first axial and first rotational positions; and said reel being freed for axial disassembly and assembly motion when said first means is in said second rotational position on said shaft.

4. A device including a reel, a shaft, and means releasably locking said reel upon said shaft, comprising:

a turntable permanently mounted on said shaft for movement between first and second axial positions, said turntable also being movable between first and second rotational positions with respect to said shaft but only when said turntable is in said second axial position on said shaft, said turntable also being provided with a notched portion;

a finger element immovably mounted on said shaft and extending radially therefrom for engaging said notched portion of said turntable and for thereby positively retaining said turntable against rotation with respect to said shaft and in said first and second rotational positions when said turntable is concurrently in said first axial position on said shaft;

a spring mounted on said shaft and urging said turntable toward said first axial position thereof;

said reel being engaged by said turntable and being thereby secured against rotational motion with respect to said shaft when said turntable is concurently in said first axial and first rotational positions; and said reel being engaged by said finger element and being thereby secured against axial disassembly motion with respect to said shaft when said turntable is concurrently in said first axial and first rotational positions.

5. A device including a reel, a shaft, and means releasably locking said reel upon said shaft, comprising:

a turntable permanently mounted on said shaft for movement between first and second axial positions, said turntable also being movable between first and second rotational positions with respect to said shaft but only when said turntable is in said second axial position on said shaft;

said turntable having a central tubular hub engaging said shaft, said tubular hub having a pair of first and second radial notches in the end thereof adjacent the free end of said shaft, said notches corresponding to said first and second rotational positions of said turntable;

a finger element mounted on said shaft and extending radially therefrom for engaging said notches one at a time and for thereby positively retaining said turntable in the corresponding one of said first and second rotational positions when said turntable is concurrently in said first axial position on said shaft;

a spring mounted on said shaft and urging said turntable toward said first axial position thereof;

a keying lug extending radially from said turntable hub in the same rotational position thereon as said second notch;

said reel having a keyway formed therein for engagement with said keying lug and for thereby securing said reel against rotational motion with respect to said shaft when said turntable is concurrently in said first axial and first rotational positions; and said reel engaged by said finger element and being thereby secured against axial diassembly motion with respect to said shaft when said turntable is concurrently in said first axial and first rotational positions.

6. A device including a reel, a shaft, and means releasably locking said reel upon said shaft, comprising:

a turntable permanently mounted on said shaft for movement between first and second axial positions, said turntable also being movable between first and second rotational positions with respect to said shaft but only when said turntable is in said second axial position on said shaft;

said turntable having a central tubular hub engaging said shaft, said tubular hub having a pair of first and second radial notches in the end thereof adjacent the free end of said shaft, said notches corresponding to said first and second rotational positions of said turntable;

a finger element mounted on the free end of said shaft and extending radially therefrom and beyond the periphery of said turntable hub for engaging said notches one at a time and for thereby positively retaining said turntable in the corresponding one of said first and second rotational positions when said turntable is concurrently in said first axial position on said shaft;

a spring mounted on said shaft and urging said turntable toward said first axial position thereof;

a keying lug extending radially from said turntable hub in the same rotational position thereon as said second notch;

said reel having a keyway formed therein for engagement with said keying lug and for thereby securing said reel against rotational motion with respect to said shaft when said turntable is concurrently in said first axial and first rotational positions;

said reel being engaged by said finger element and being thereby secured against axial disassembly motion with respect to said shaft when said turntable is concurrently in said first axial and first rotational positions; and said reel keyway being dimensioned for clearing said finger element when said turntable is in the second rotational position to permit axial disassembly and assembly motion of said reel with respect to said shaft and turntable.

7. A device including a reel, a shaft, and means releasably locking said reel upon said shaft, comprising:

a turntable mounted on said shaft for movement between first and second axial positions, said turntable also being movable between first and second rotational positions with respect to said shaft but only when said turntable is in said second axial position on said shaft;

spring means mounted on said shaft and urging said turntable in the direction of the free end of said shaft;

said turntable having a central tubular hub engaging said shaft, said tubular hub having a pair of first and second radial notches in the end thereof adjacent the free end of said shaft, said notches corresponding to said first and second rotational positions of said turntable;

a finger element mounted on the free end of said shaft and extending radially therefrom and beyond the periphery of said turntable hub for engaging said notches one at a time and for thereby retaining said turntable in the corresponding one of said first and second rotational positions when said turntable is concurrently in said first axial position on said shaft;

a keying lug extending radially from said turntable hub in the same rotational position thereon as said second notch;

said reel having a keyway formed therein for engagement with said keying lug and for thereby securing said reel against rotational motion with respect to said shaft when said turntable is concurrently in said first axial and first rotational positions;

said reel being engaged by said finger element and being thereby secured against axial disassembly motion with respect to said shaft when said turntable is concurrently in said first axial and first rotational positions; and said reel keyway being dimensioned for clearing said finger element when said turntable is in the second rotational position to permit axial disassembly and assembly motion of said reel with respect to said shaft and turntable.

8. A device including a reel, a shaft, and means releasably locking said reel upon said shaft, comprising:

a turntable mounted on said shaft for movement between first and second axial positions, said turntable also being movable between first and second rotational positions with respect to said shaft but only when said turntable is in said second axial position on said shaft;

spring means mounted on said shaft and urging said turntable in the direction of the free end of said shaft;

said turntable having a central tubular hub engaging said shaft and extending toward the free end of said shaft, said tubular hub having three peripherally equi-spaced first radial notches and three inter-positioned and equi-spaced second radial notches in the end thereof adjacent the free end of said shaft, said first and second notches corresponding to said first and second rotational positions of said turntable;

three peripherally equi-spaced finger elements mounted on the free end of said shaft and extending radially therefrom and beyond the periphery of said turntable hub for engaging said notches three at a time and for thereby retaining said turntable in the corresponding one of said first and second rotational positions when said turntable is concurrently in said first axial position on said shaft;

three peripherally equi-spaced keying lugs extending radially from said turntable hub in the same rotational positions thereon as said second notches;

said reel having three peripherally equi-spaced keyways formed therein for engagement with said keying lugs and for thereby securing said reel against rotational motion with respect to said shaft when said turntable is concurrently in said first axial and first rotational positions;

said reel being engaged by said finger elements and being thereby secured against axial disassembly motion with respect to said shaft when said turntable is concurrently in said first axial and first rotational positions; and said reel keyways being dimensioned for clearing said finger elements when said turntable is in the second rotational position to permit axial disassembly and assembly motion of said reel with respect to said shaft and turntable.

References Cited by the Examiner

UNITED STATES PATENTS

| | | | |
|---|---|---|---|
| 1,394,177 | 10/21 | Jones | 287—53 |
| 1,655,299 | 1/28 | Thornton | 242—68.3 |
| 2,028,686 | 1/36 | Prodromos et al. | 287—53 |
| 2,157,153 | 5/39 | Troche | 242—68.3 |
| 2,635,822 | 4/53 | Burman | 242—68.3 X |
| 2,663,509 | 12/53 | Hinchman | 242—68.3 X |
| 3,002,707 | 10/61 | Noble | 242—68.3 |

JORDAN FRANKLIN, *Primary Examiner.*